No. 853,594. PATENTED MAY 14, 1907.
H. PATAUD.
WHEEL RIM OR FELLY.
APPLICATION FILED JAN. 2, 1907.

WITNESSES
W. P. Burk
Alvin G. White

INVENTOR
Henri Pataud

UNITED STATES PATENT OFFICE.

HENRI PATAUD, OF PARIS, FRANCE.

WHEEL RIM OR FELLY.

No. 853,594.

Specification of Letters Patent.

Patented May 14, 1907.

Application filed January 2, 1907. Serial No. 350,374.

*To all whom it may concern:*

Be it known that I, HENRI PATAUD, a citizen of France, residing at 15 Rue de la Fédération, Paris, France, have invented new and useful Improvements in Wheel Rims or Fellies, of which the following is a specification.

This invention relates to an improved dismountable felly or rim for vehicle wheels comprising two grooved rings which form, by the superposition of their respective grooves, an annular closed housing in which is arranged an elastic setting collar, said felly or rim being substantially characterized by the employment of means whereby the annular housing may be rendered tight and by the device for expanding and closing the elastic collar.

Figure 1:
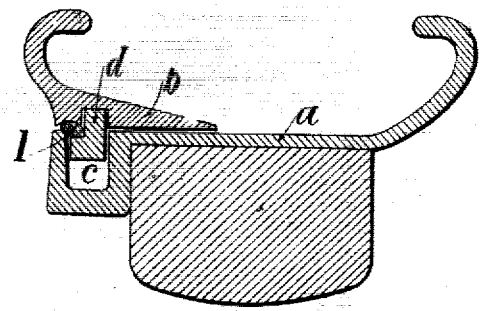
Figure 2:
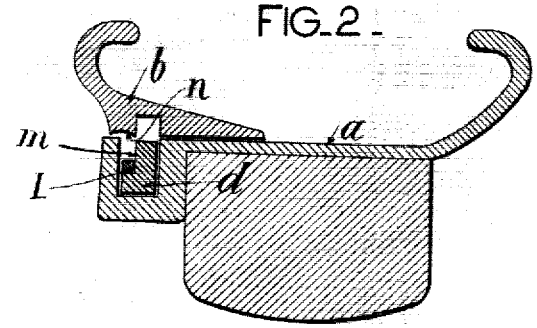
Figures 3, 4:
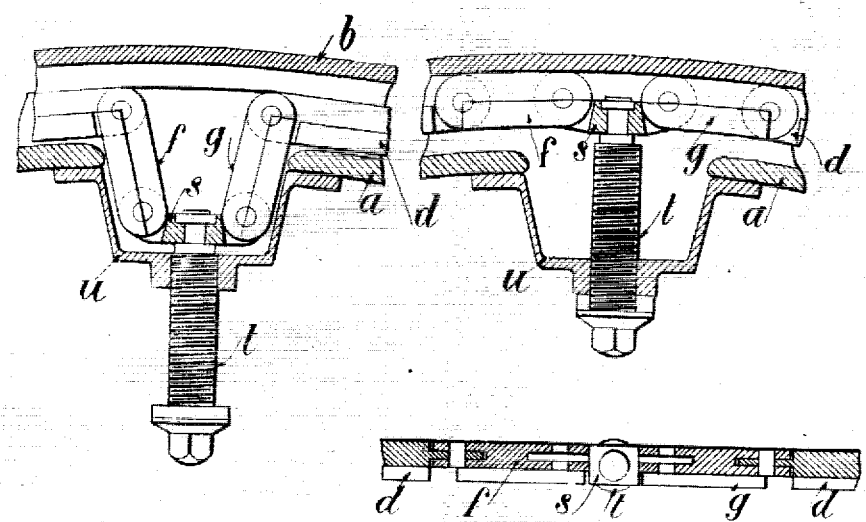
Figure 5:

In the annexed drawing, Figure 1 is a cross section of the felly in its active or operative position, illustrating the device for rendering tight the annular housing. Fig. 2 is a similar section of the felly in its inoperative position. Fig. 3 is a longitudinal section of a portion of the felly illustrating the collar actuating device in its inoperative position, and, Fig. 4 is a similar section of the felly in the operative position. Fig. 5 is a longitudinal section showing part of the ring and its securing means.

Referring to Figs. 1 and 2, it will be seen that the felly comprises a stationary grooved ring $a$ and a movable grooved ring $b$. When said rings are fitted one against or above the other, their grooves are superposed and form an annular housing $c$. In this housing is inserted an elastic steel collar $d$ which, according as it is expanded or closed, will lock the movable ring $b$ of the felly or will liberate it.

To render the housing $c$ tight, an india rubber ring $l$ is used which is inserted in a recess $m$ formed around the elastic collar $d$. When the felly is in the inoperative position, a small housing is formed in which the india rubber ring $l$ is engaged. This ring must be smaller than the felly so as to remain tight when placed in the recess $m$.

When the ring $d$ is expanded into the operative position, the rubber ring $l$ is compressed against a recess $n$ formed on the movable ring of the felly, as seen in Fig. 1, whereby perfect tightness is insured in the joint existing between the two rings of the felly and hence in the housing $c$.

The expanding and closing of the elastic collar is insured by means of a screw $t$. By turning said screw it is caused to act upon connecting links $f g$ pivoted on the free ends of the collar. These links are suitably recessed to receive the india rubber ring $l$ and their free ends are pivoted on a winged nut shaped member $s$ in which the end of the screw $t$ is capable of turning freely. This screw is screwed through a casing $u$ secured in a tight manner on the stationary ring $a$ of the felly. It may be understood that with this construction it is only necessary to unscrew the screw $t$ for unmounting the felly, and to screw it for fixing the movable member.

Having now described my invention, what I claim as new and desire to secure by Letters Patent is:

1. A dismountable felly comprising in combination a stationary ring $a$, a movable ring $b$, grooves provided in each of said rings and adapted to form by their superposition an annular housing $c$, an elastic steel collar $d$, an india rubber ring $l$, a recess $m$ formed in the elastic collar $d$ adapted to receive the india rubber ring, a recess $n$ formed in the movable ring $b$ against which is adapted to be compressed the india rubber ring, and operative means for expanding and closing the collar $d$ in its housing, substantially as described and for the purpose set forth.

2. A dismountable felly comprising in combination a stationary ring $a$, a movable ring $b$, grooves provided in each of said rings and adapted to form by their superposition an annular housing $c$, an elastic steel collar $d$, connecting links $f$ and $g$ pivoted respectively by one of their ends to the free ends of the collar, a winged nut shaped member $s$ to which are pivoted the free ends of the connecting links $f g$, a screw $t$ the end of which is adapted to turn freely in the member $s$, and a casing $u$ secured in a tight manner on the stationary member $a$ and through which is adapted to be screwed the screw $t$, substantially as described and for the purpose set forth.

3. A dismountable felly comprising in combination a stationary ring $a$, a movable ring $b$, grooves provided in each of said rings and adapted to form by their superposition an annular housing $c$, an elastic steel collar $d$, an india rubber ring $l$, a recess $m$ formed in the elastic collar $d$ adapted to receive the india rubber ring, a recess $n$ formed in the movable ring $b$ against which is adapted to be compressed the india rubber ring, connecting links $f$ and $g$ pivoted respectively by one of their ends to the free ends of the collar, recesses formed in said links and adapted to register with the recess $m$ of the collar $d$, a winged nut shaped member $s$ to which are pivoted the free ends of the connecting links $f g$, a screw $t$ the end of which is adapted to turn freely in the member $s$, and a casing $u$ secured in a tight manner on the stationary member $a$ and through which is adapted to be screwed the screw $t$, substantially as described and for the purpose set forth.

In testimony whereof I have signed my name to this specification in the presence of two subscribing witnesses.

HENRI PATAUD.

Witnesses:
 ANTOINE LAVOIN,
 H. C. COXE